US00RE46845E

(19) United States
(12) Reissued Patent
Tisch et al.

(10) Patent Number: US RE46,845 E
(45) Date of Reissued Patent: May 15, 2018

(54) RADIAL BEARING

(71) Applicant: Schaeffler Technologies AG & Co. KG, Herzogenaurach (DE)

(72) Inventors: Siegfried Tisch, Gerlingen (DE); Peter Solfrank, Frensdorf (DE)

(73) Assignee: Schaeffler Technologies AG & Co. KG, Herzogenaurach (DE)

(21) Appl. No.: 15/345,891

(22) Filed: Nov. 8, 2016

Related U.S. Patent Documents

Reissue of:
(64) Patent No.: 7,628,133
Issued: Dec. 8, 2009
Appl. No.: 11/548,727
Filed: Oct. 12, 2006

U.S. Applications:
(60) Provisional application No. 60/726,253, filed on Oct. 13, 2005.

(51) Int. Cl.
*F02B 75/06* (2006.01)
*F16C 17/02* (2006.01)
(Continued)

(52) U.S. Cl.
CPC ..... *F16C 17/02* (2013.01); *F16C 19/02* (2013.01); *F16C 19/46* (2013.01); *F16C 33/581* (2013.01);
(Continued)

(58) Field of Classification Search
CPC ..... F16C 17/02; F16C 19/06; F16C 19/46; F16C 33/581; F16C 33/585; F16C 2361/53; F16F 15/267
(Continued)

(56) References Cited

U.S. PATENT DOCUMENTS 3,578,830 A * 5/1971 Pitner ..... F16C 19/466 384/447
3,960,419 A * 6/1976 Brawley ..... F16C 19/26 384/571
(Continued)

FOREIGN PATENT DOCUMENTS

DE 389786 2/1924
DE 3332654 3/1984
(Continued)

OTHER PUBLICATIONS

Herzog Intertec—Engineering Projektmanagement Fertigungtechnik Development, Herzog Intertec—Your number-one total solutions provider, (date unknown) http://www.herzog-intertec.de; http://www.herzog-intertec.de/index.php?39; http://www.herzog-intertec.de/index.php?40: http://www.herzog-intertec.de/index.php?41.*
(Continued)

*Primary Examiner* — William Doerrler
(74) *Attorney, Agent, or Firm* — Volpe and Koenig, P.C.

(57) ABSTRACT

A radial bearing (1a, 1b, 1c, 1d), especially a roller bearing (9) comprising an outer part (3) opposite an inner part (6), which rotate relative to each other about a common longitudinal axis (5) is provided, wherein the radial bearing (1a, 1b, 1c, 1d) includes a bearing seat (8a, 8b, 8c, 8d), which is formed in the outer part (3) or on the inner part (6) and which is generally stationary relative to a radial load (10a, 10b, 10c, 10d) acting on the bearing seat (8a, 8b, 8c, 8d) in a load zone (12a, 12b, 12c, 12d). The bearing seat (8a, 8b, 8c, 8d)
(Continued)

features a variable width over its extent in a direction of the longitudinal axis (5), such that, starting from the load zone (12a, 12b, 12c, 12d), the bearing seat (8a, 8b, 8c, 8d) is significantly narrowed outside of the load zone (12a, 12b, 12c, 12d).

12 Claims, 4 Drawing Sheets

(51) Int. Cl.
*F16C 19/46* (2006.01)
*F16C 19/02* (2006.01)
*F16C 33/58* (2006.01)
*F16F 15/26* (2006.01)

(52) U.S. Cl.
CPC ..... *F16C 33/585* (2013.01); *F16F 15/267* (2013.01); *F16C 2361/53* (2013.01)

(58) Field of Classification Search
USPC ..... 123/192.2, 195 R; 74/63; 384/100, 99, 384/432, 420, 447, 571
See application file for complete search history.

(56) References Cited

U.S. PATENT DOCUMENTS

| | | | | |
|---|---|---|---|---|
| 5,000,140 | A * | 3/1991 | Bates et al. | F02F 7/0053 123/192.2 |
| 5,628,577 | A | 5/1997 | Ribeiro et al. | F02F 3/0069 403/150 |
| 6,305,339 | B1 | 10/2001 | Iwata et al. | F16F 15/264 123/192.2 |
| 6,616,338 | B2 * | 9/2003 | Tibbits | F16C 33/58 384/447 |
| 6,984,070 | B2 * | 1/2006 | Sugimura | F16C 9/02 123/195 R |
| 7,322,750 | B1 * | 1/2008 | Besselman | F02F 7/0053 123/195 R |
| 2005/0078895 | A1 * | 4/2005 | Kanbe et al. | F02F 7/0053 384/432 |

FOREIGN PATENT DOCUMENTS

| | | |
|---|---|---|
| DE | 3326467 | 1/1985 |
| DE | 3733982 | 4/1989 |
| DE | 3813029 | 11/1989 |
| DE | 19828847 | 2/2000 |
| DE | 19926406 | 12/2000 |
| EP | 0753678 | 1/1997 |
| EP | 1167737 | 1/2002 |
| FR | 1301919 | 7/1962 |
| JP | 08028570 | 2/1996 |
| JP | 2005-16644 A2 | 1/2005 |

OTHER PUBLICATIONS

Machine translation of JP2005016644A.*

* cited by examiner

RADIAL BEARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to a radial bearing, especially a roller bearing, comprising an outer part opposite an inner part, wherein the outer part and the inner part rotate relative to each other about a common longitudinal axis, wherein the radial bearing comprises a bearing seat, which is formed in the outer part or on the inner part and which is generally stationary relative to a radial load acting on the bearing seat in a load zone.

BACKGROUND OF THE INVENTION

In principle, such a load case of the radial bearing is known in the state of the art and, in the case of the roller bearing, under the designation of the so-called point load, at which the radial load is generally stationary as a function of the movement relationships relative to the inner ring or the outer ring of the roller bearing. In contrast, the so-called peripheral load involves a load case, in which the radial load rotates relative to the inner ring or to the outer ring of the roller bearing. At this point it should be expressed that with the term "generally," the radial load, strictly speaking, does not have a point-like effect, but instead can feature a certain radial variation width.

Due to the radial load, the forces to be transferred from the load zone resting on the bearing seat are an essential criteria for setting width dimensions that are stable over the service life for the bearing seat. However, for the required width outside of the load zone, this criteria still plays only a subordinate role, because here the bearing seat is subjected to a clearly lower mechanical load and, in individual cases, to no mechanical load at all. Nevertheless, bearing seats known in the state of the art have a rotationally symmetric shape with constant width and therefore are overdimensioned outside of the load zone in terms of the mechanical loadability for the load case of the point load presented here. This can produce significant disadvantages to the extent that the bearing seat, which is, for the most part, superior in terms of production, has a mass, which is undesired both technically and financially, and which is also avoidable, outside of the load zone. Simultaneously, this leads to unnecessarily high processing costs for the bearing seat, which is to be machined with fine precision completely over its constant width, even outside of the load zone.

SUMMARY

Therefore, the objective of the invention is to provide a radial bearing of the above-noted type, such that the cited disadvantages are overcome with simple means. Here, the shaping of the radial bearing should lead, in particular, to advantages in terms of weight and costs relative to bearings known in the state of the art.

According to the invention, this objective is met in that the bearing seat features a width that varies over its extent in a direction of the longitudinal axis, such that the bearing seat, starting from the load zone, becomes significantly narrower outside of the load zone. A radial bearing embodied in this way optimally takes into consideration the circumstance that the bearing seat receiving a point load can become considerably narrower outside of the load zone and thus the potential of known bearings for reducing the rotationally moving mass, weight, processing expense, and costs can be used without negatively affecting the functional properties of the radial bearing. Such a negative effect would be produced when, due to the narrowing of the bearing seat, a critical bearing seat width is reached, below which a given fatigue strength of the radial bearing is no longer guaranteed. In the case of a radial bearing formed as a hydrodynamic sliding bearing, the decisive criteria for this negative effect can be a lubricant film that no longer bears weight or, in the case of a roller bearing, an impermissibly high loading of the bearing seat outside of the load zone.

Furthermore, the invention can be used advantageously, especially for the arrangements described below, in the load cases, in which a point load acts on the bearing seat. In a first load case, the outer part should be formed as a housing, the inner part as a shaft mounted in the housing, and the bearing seat of variable width should be formed on the shaft, wherein the radial load rotates with the shaft. A typical example for this load case is a defined unbalanced weight, which rotates with the shaft and which can be advantageously reinforced by the bearing seat of variable width while simultaneously reducing the mass of the shaft.

In a second load case, the outer part should be formed as a housing, the inner part as a shaft mounted in the housing, and the bearing seat of variable width should be formed in the housing, wherein the radial load is generally stationary relative to the housing. In this case, a bearing seat of variable width can lead to a mass reduction of the housing, wherein a non-uniform mass distribution of the bearing seat over its extent does not require counterbalancing of the stationary housing.

In a third load case, the outer part should be formed as a hub, the inner part as an axle bolt supporting the hub, and the bearing seat of variable width should be formed in the hub, wherein the radial load rotates with the hub. Here, in the case of hub bearing with a defined unbalanced weight on the hub, despite an action of the bearing seat, which is narrower in the unbalanced weight direction, directed against the unbalanced weight, it can be advantageous to form these with variable width, in order to reduce the surface area of the bearing seat in favor of more economical processing.

Finally, in a fourth load case, the outer part should be formed as a hub, the inner part as an axle bolt supporting the hub, and the bearing seat of variable width should be formed on the axle bolt, wherein the radial load is generally stationary relative to the axle bolt. In this case, the processing of the bearing seat with its narrow section is also simplified, while simultaneously a reduction of the mass of the axle bolt can be achieved.

For the first load case, it is also provided that the shaft is formed as an unbalanced weight, whose center of mass is arranged eccentric to the longitudinal axis and results from one or more recesses on the outer periphery of the unbalanced weight shaft. Here, the recesses should run partially or completely on the other side of the longitudinal axis from the unbalanced weight relative to the center of mass of the unbalanced weight shaft and should be directly adjacent to the bearing seat of variable width. With an unbalanced weight shaft formed in this way, for the most part the conflicting goal of a mass that is as small as possible for the largest possible unbalanced weight of the shaft can be solved especially advantageously. This is substantiated essentially in that the recesses now extend up to the narrowed bearing seat and can be used simultaneously as an increased negative mass for reinforcing the unbalanced weight. Nevertheless, in comparison with conventional shafts with bearing seats of constant width, this opens up the possibility not only of increasing the unbalanced weight of the shaft for simultaneous mass reduction, but also makes possible a more extensive mass reduction of the shaft, in the case of a non-variable unbalanced weight, such that the original unbalanced weight increase is equalized by additional recesses, which reduce the mass and which are arranged on the unbalanced weight shaft on the side of the longitudinal axis relative to the center of mass. Obviously, a fit can also be found between these two limiting cases for the unbalanced weight shaft, according to whether the design focus is on a moderate mass reduction with significant increase in unbalanced weight or on a clear mass reduction with unchanged increase in unbalanced weight.

In an improvement of the invention, the unbalanced weight shaft belongs to a device for balancing the mass forces and/or mass moments of a reciprocating piston internal combustion engine with a crankshaft arranged parallel to the longitudinal axis of the unbalanced weight shaft and indirectly driving the unbalanced weight shaft for the reciprocating piston internal combustion engine. Such a balancing device is known to someone skilled in the art in the field of reciprocating piston internal combustion engines, especially for in-line or V arrangements, as an effective measure for reducing vibrations due to oscillating mass forces. However, especially for reciprocating piston internal combustion engines used in the field of vehicles, the requirements on the light construction quality of the reciprocating piston internal combustion engine are continuously rising, so that the previously mentioned possibilities for reducing the mass of the unbalanced weight shaft can be used particularly advantageously for this application. The lower mass moment of inertia of the unbalanced weight shaft also leads to improved dynamics of the reciprocating piston internal combustion engine, because less resistance is counteracted by a high rotational speed gradient. In addition, especially for diesel engines with pronounced rotational vibrations of the crankshaft in the lower range of rotational speeds, the peak mechanical load in the driving range of the balancing device can be reduced with a decreased moment of inertia of the unbalanced weight shaft.

The previously stated considerations apply to a greater degree when the balancing device includes two unbalanced weight shafts, which rotate in opposite directions at twice the crankshaft rotational speed. This arrangement, which is also known to someone skilled in the art as a Lancaster balance, is used for balancing the second order free mass forces in a four-cylinder, in-line engine.

In an especially advantageous continuation of the invention, it is further provided that for radial bearing of the unbalanced weight shaft, there is at least one roller bearing formed as a needle bearing without an inner ring and preferably as a needle sleeve. In addition to the favorable friction properties of the roller bearing in comparison with a hydrodynamic sliding bearing, which can lead to considerable friction power losses in the drive of the unbalanced weight shaft, especially at low temperatures and/or high viscosity hydraulic means, the advantages of the mass reduction and/or the unbalanced weight increase of the unbalanced weight shaft can be even further expanded by its radial bearing formed as a needle bearing, because the bearing seat included by a needle bearing as a rule can be narrowed more than would be possible in the case of the hydrodynamic sliding bearing based on consideration of a weight-bearing lubricant film. Thus, the use of a needle sleeve, which is known to someone skilled in the art as a component with very small radial installation height with a non-cutting shaped outer ring and a needle collar, permits above all an especially installation space-saving and economical radial bearing for the unbalanced weight shaft with sufficient fatigue strength.

Finally, in another construction of the invention, it can be advantageous that the width of the needle bearing generally corresponds to a maximum width of the variable width bearing seat allocated to the needle bearing, while a minimum width of the bearing seat is smaller than the length of the needles of the needle bearing. Simultaneously, for lubricating the needle bearing, only one unpressurized lubricant spray should be provided. With this construction of the invention, the lubricating conditions on the needle bearing can be improved in that the needles projecting locally and temporarily over the bearing seat can be exposed to the unpressurized lubricant spray to a greater degree. Conversely, this can also be beneficial for a discharge of abrasive particles from the track region of the needle bearing in favor of increased wear resistance of the radial bearing. In order to guarantee total contact of the length of the bearing seat with the needles in the region of the minimal width of this bearing seat, for this construction the use of a one-row needle bearing is to be preferred relative to the use of a multi-row needle bearing.

BRIEF DESCRIPTION OF THE DRAWINGS

Additional features of the invention will become apparent from the following description and from the drawings, in which the radial bearing according to the invention is shown simplified basically for the previously mentioned load cases and, as an example, with reference to an unbalanced weight shaft of a device for balancing the masses of a reciprocating piston internal combustion engine. Shown are.

DETAILED DESCRIPTION OF THE PREFERRED EMBODIMENTS

Figure 1:
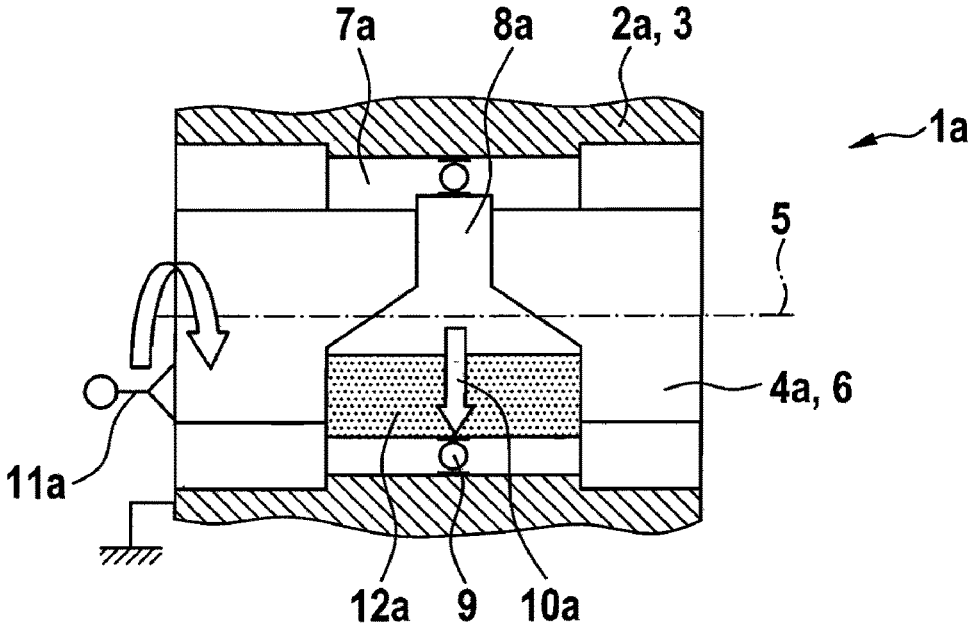
FIG. 1 the radial bearing for the first load case in schematic representation.

In FIG. 1, a radial bearing 1a according to the invention for a first load case is disclosed. Shown is an outer part 3, which is formed as a housing 2a and in which the inner part 6 formed as a shaft 4a and rotating about a longitudinal axis 5 is mounted radially. In the illustrated embodiment, a roller bearing 9 is located between a bearing seat 7a formed in the housing 2a and a bearing seat 8a formed on the shaft 4a, which can also be used as the radial bearing 1b, 1c, 1d according to FIGS. 2-4 as a bearing means. A radial load 10a rotating with the shaft 4a leads to a peripheral load on the bearing seat 7a of the housing 2a due to an unbalanced weight 11a arranged on the shaft 4a, while the radial load 10a is generally stationary relative to the bearing seat 8a of the shaft 4a and a load zone 12a (shown with shading) constructed on the shaft. While the bearing seat 7a of the housing 2a is constructed rotationally symmetric due to the peripheral load, the bearing seat 8a of the shaft 4a receiving a point load features a variable width over its extent, in that, starting from the load zone 12a, the bearing seat 8a is narrowed considerably outside of this zone. Therefore, because the load zone 12a extends over an angle of a maximum of 180° over the extent of the bearing seat 8a of the shaft 4a—wherein, in the shown case of the roller bearing, this angle can also lie significantly under this value due to the bearing play that occurs in practice—the roller bearing 9 is considerably smaller outside of the load zone 12a and in the limiting case, it is not loaded at all, so that in the case of the roller bearing under a narrowing of the bearing seat 8a, a bearing seat 8a with a local width of zero is also understood to correspond to a break in the bearing seat 8a in its extent. This applies analogously for the load cases shown in FIGS. 2-4.

Figure 2:
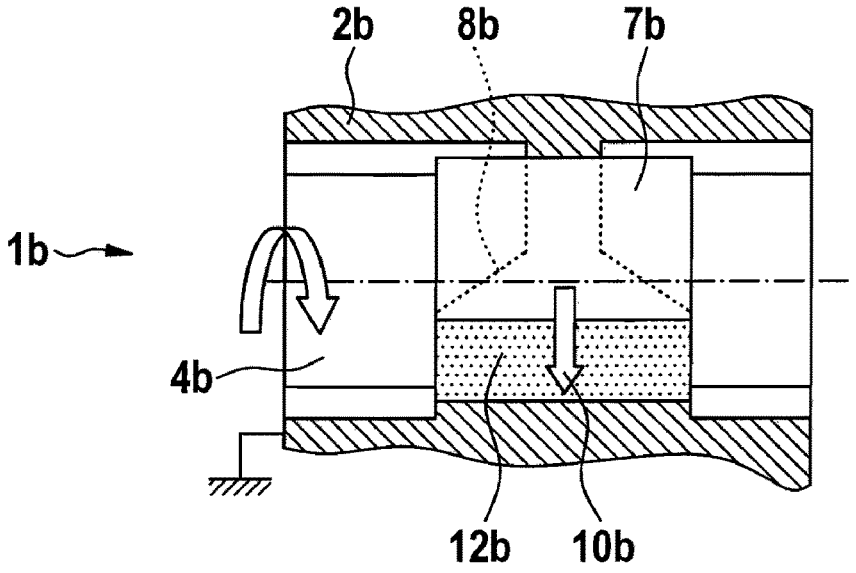
FIG. 2 the radial bearing for the second load case in schematic representation.

The load case shown in FIG. 2 for a radial bearing 1b according to the invention differs from that according to FIG. 1 in that a shaft 4b mounted in a housing 2b receives a radial load 10b that is stationary relative to the housing 2b. Accordingly, a peripheral load acts on a rotationally symmetric bearing seat 7b of the shaft 4b, while the housing 2b features a bearing seat 8b (shown with dotted lines) of variable width with stationary load zone 12b (shown with shading).

Figure 3:
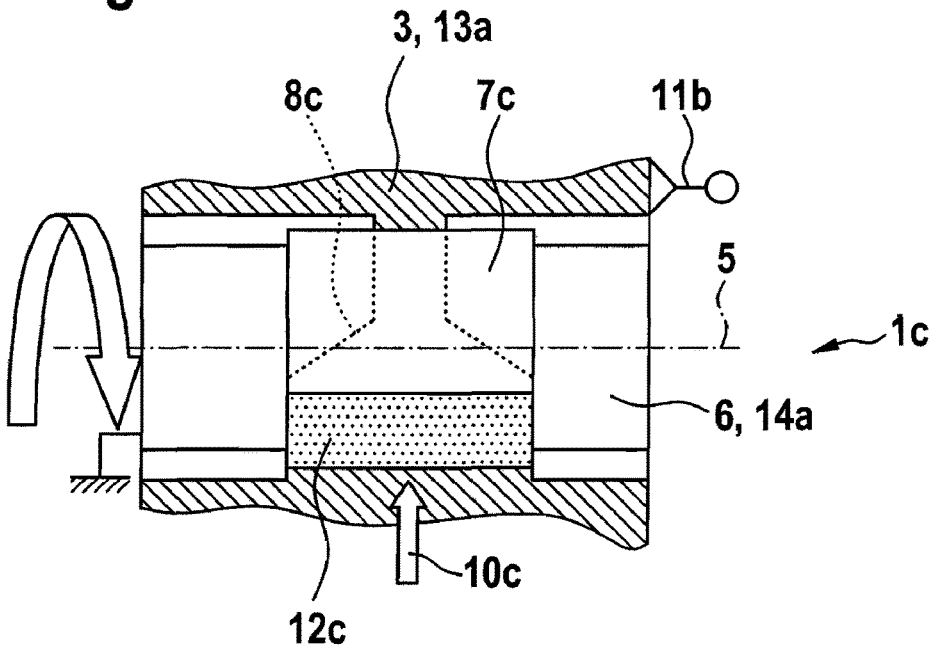
FIG. 3 the radial bearing for the third load case in schematic representation.

In the load case shown in FIG. 3 for a radial bearing 1c according to the invention, the outer part 3 is formed as a hub 13a rotating about the longitudinal axis 5 and the inner part 6 as an axle bearing 14a mounted in the hub 13a. Here, a rotationally symmetric bearing seat 7c of the axle bolt 14a is loaded with a radial load 10c generating a peripheral load due to an unbalanced weight 11b arranged on the hub 13a. In contrast, a bearing seat 8c (shown with dotted lines) receiving a point load in the hub 13a has a variable width over its extent, in that, starting from a load zone 12c (shown with shading), the bearing seat 8c is narrowed considerably outside of this load zone.

Figure 4:
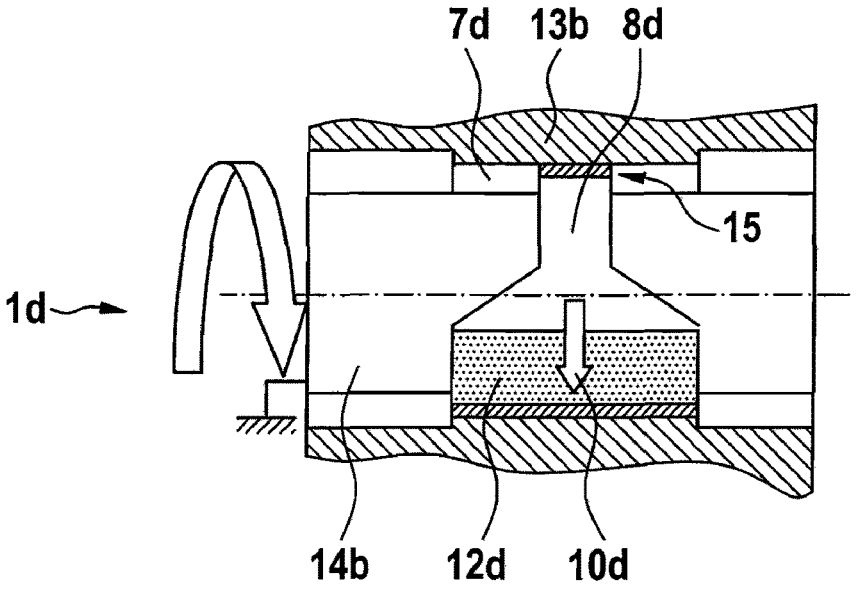
FIG. 4 the radial bearing for the fourth load case in schematic representation.

Finally, the load case shown in FIG. 4 for a radial bearing 1d according to the invention differs from that according to FIG. 3 in that an axle bolt 14b receives a radial load 10d that is stationary relative to the bolt. Accordingly, in a hub 13b rotating about the axle bolt 14b, a bearing seat 7d of constant width receiving peripheral loads is formed, while a bearing seat 8d of the axle bolt 14b receives a point load and features a variable width over its extent, in that, starting from a load zone 12d (shown with shading), the bearing seat 8d is considerably narrowed outside of this zone. As an alternative to the roller bearing 9 shown in FIG. 1, here a hydrodynamic sliding bearing 15 is formed as bearing means between the bearing seats 7d and 8d. Obviously, the sliding bearing 15 can also find use as bearing means in the other load cases according to FIGS. 1-3.

Figure 5:
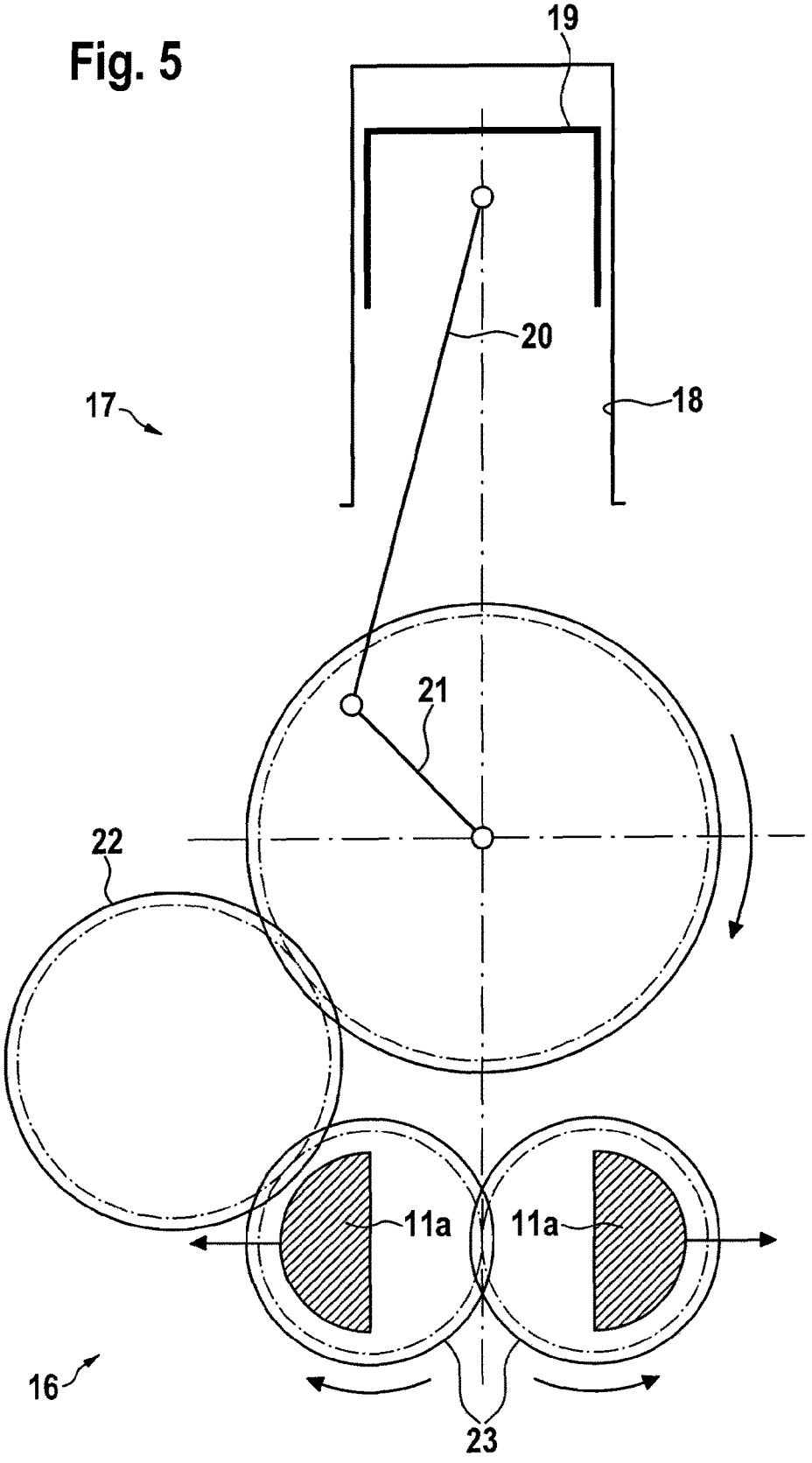
FIG. 5 the device for balancing masses of a reciprocating piston internal combustion engine in schematic representation.

The load case shown in FIG. 1 can occur, among other places, in the device 16 shown schematically in FIG. 5. This device 16 is used for balancing second order mass forces of a reciprocating piston internal combustion engine 17 in four-cylinder, in-line construction (Lancaster balance) shown with reference to a gear schematic. The reciprocating piston internal combustion engine 17 includes a piston 19, which oscillates in a cylinder 18 and whose longitudinal movement is converted by a connecting rod 20 into a rotation of a crankshaft 21. The crankshaft 21 drives two unbalanced weight shafts 23 with the unbalanced weights 11a via an intermediate shaft 22, wherein the unbalanced weight shafts 23 rotate in opposite directions parallel to the crankshaft 21 at twice the crankshaft rotational speed.

Figure 6:
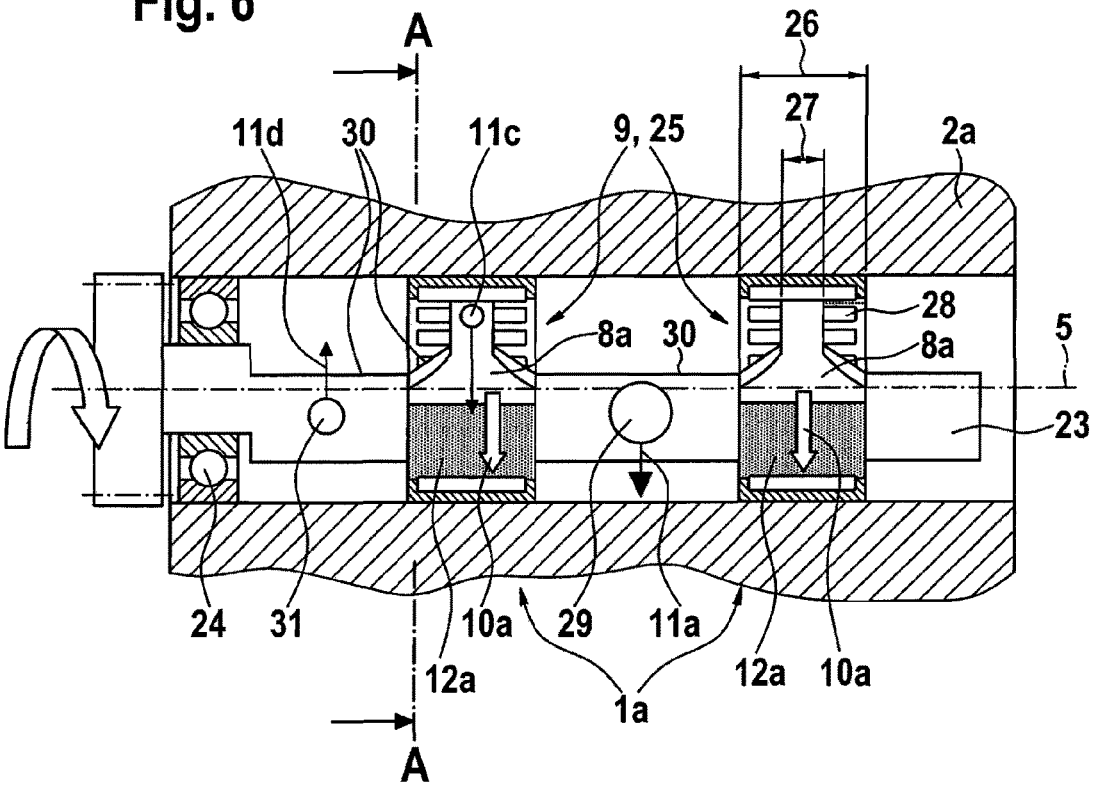
FIG. 6 one of the unbalanced weight shafts from FIG. 5 in simplified longitudinal representation.

The bearing of one of these unbalanced weight shafts 23 appears in detail from its longitudinal representation according to FIG. 6. An axial bearing of the unbalanced weight shaft 23 is realized on the drive side by means of a ball bearing 24 and its radial bearing 1a is realized by means of two roller bearings 9 formed as needle sleeves 25 and friction set in the housing 2a of the reciprocating piston internal combustion engine 17. The bearing seats 8a of the unbalanced weight shaft 23 encompassed by the needle sleeves 25 feature a variable width over their extent, such that they are significantly narrowed outside of load zones 12a (shown with shading) receiving a point load due to the radial loads 10a from the unbalanced weight 11a rotating with the unbalanced weight shaft 23. The width of each needle sleeve 25 is dimensioned so that it corresponds to a maximum width 26 of the associated bearing seat 8a in the region of its load zone 12a, while a minimum width 27 of the bearing seat 8a outside of the load zone 12a is significantly smaller than the length of the needles 28 of the needle sleeve 25. Because only an unpressurized lubricant spray is provided within the housing 2a, the lubricating conditions at the locally and temporarily extended needles 28 can be considerably improved. For the case that the needles 28 rotating about the longitudinal axis 5 of the unbalanced weight shaft 23 are exposed outside of the load zone 12a only to a centrifugal force acting in the direction of the housing 2a, the minimum width 27 of the bearing seat 8a can also be selected in a not-shown embodiment so that the bearing seat 8a does not extend completely over an extent of 360°, but instead is broken outside of the load zone 12a.

The unbalanced weight 11a acting in the direction of the arrow for the unbalanced weight shaft 23 is based on a center of mass 29 eccentric to its longitudinal axis 5 and represented symbolically in FIG. 6. This eccentricity results from recesses 30 on the outer periphery of the unbalanced weight shaft 23, which run partially or completely on the other side of the longitudinal axis 5 relative to the center of mass 29. Because the recesses 30 are directly adjacent to the bearing seats 8a, the narrowing of the bearing seats 8a on the other side of the longitudinal axis 5 leads both to an advantageous mass reduction and also to an additional unbalanced weight 11c relative to an unbalanced weight shaft with bearing seats of constant width. Depending on the desired properties of the device 16, this additional unbalanced weight 11c can be used in a range, which extends, on one side, between the limit cases of an improved mass balancing through maximum increase of the unbalanced weight 11a for simultaneously reduced mass of the unbalanced weight shaft 23 and, on the other side, through a maximum mass reduction for constant unbalanced weight 11a of the unbalanced weight shaft 23.

Figure 7:
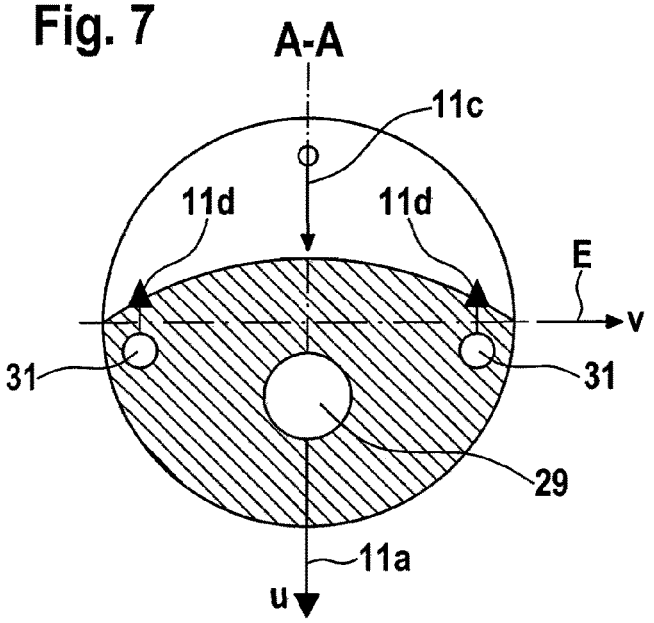
FIG. 7 the section A-A from FIG. 6 in an enlarged representation.

A structural construction in the area of the second limit case is shown symbolically in the present embodiment in the form of an unbalanced weight 11d equalizing the additional unbalanced weight 11c. As is also visible from FIG. 7, the equalizing unbalanced weight 11d is formed as at least one pair of recesses 31 that are mirror inverted to the unbalanced weight direction u. These are arranged outside of the bearing seats 8a and, relative to the center of mass 29, at least predominantly on the side of the longitudinal axis 5 on the outer periphery of the unbalanced weight shaft 23 and thus act in an opposite direction relative to the unbalanced weight 11a of the center of mass 29. With regard to the maximum mass reduction of the unbalanced weight shaft 23, here it is advantageous to arrange the recesses 31 in the vicinity of a plane E, which is spanned by the longitudinal axis 5 and a direction v orthogonal to the direction u of the unbalanced weight. The recesses 31 arranged there feature a relatively small effective eccentricity relative to the longitudinal axis 5, so that their negatively acting mass in the direction u of the unbalanced weight can be selected correspondingly large for a constant degree of compensation in favor of reducing the mass of the unbalanced weight shaft 23.

| List of reference numbers and symbols | |
|---|---|
| 1a, b, c, d | Radial bearing |
| 2a, b | Housing |
| 3 | Outer part |
| 4a, b | Shaft |
| 5 | Longitudinal axis |
| 6 | Inner part |
| 7a, b, c, d | Bearing seat |
| 8a, b, c, d | Bearing seat |
| 9 | Roller bearing |
| 10a, b, c, d | Radial load |
| 11a, b, c, d | Unbalanced weight |
| 12a, b, c, d | Load zone |
| 13a, b | Hub |
| 14a, b | Axle bolt |
| 15 | Sliding bearing |
| 16 | Device |
| 17 | Reciprocating piston internal combustion engine |
| 18 | Cylinder |
| 19 | Piston |
| 20 | Connecting rod |
| 21 | Crankshaft |
| 22 | Intermediate shaft |
| 23 | Unbalanced weight shaft |
| 24 | Ball bearing |
| 25 | Needle sleeve |
| 26 | Maximum width |
| 27 | Minimum width |
| 28 | Needle |
| 29 | Center of mass |
| 30 | Recess |
| 31 | Recess |
| E | Plane |
| u | Direction of unbalanced weight |
| v | Direction orthogonal to unbalanced weight |

The invention claimed is:

1. Radial bearing comprising an outer part opposite an inner part, the outer part and the inner part are rotatable relative to each other about a common longitudinal axis, the bearing comprises a bearing seat having a circumference, which is formed in the outer part or on the inner part and which is generally stationary relative to a radial load acting on the bearing seat in a load zone, the bearing seat has a load carrying width that varies in a direction parallel to the longitudinal axis about the circumference of the bearing seat, such that, starting from the load zone, the bearing seat has a first load carrying width and outside of the load zone the bearing seat has a second width that is narrower than the first load carrying width, whereby a mass and weight of the bearing seat are reduced outside of the load zone*:*

(*i*) *wherein the outer part comprises a housing, the inner part comprises a shaft mounted in the housing, and the bearing seat of variable width is formed in the housing, and the radial load is generally stationary relative to the housing; or*

(*ii*) *wherein the outer part comprises a hub, the inner part comprises an axle bolt supporting the hub, and the bearing seat of variable width is formed in the hub, and the radial load rotates with the hub; or*

(*iii*) *wherein the outer part comprises a hub, the inner part comprises an axle bolt supporting the hub, and the bearing seat of variable width is formed on the axle bolt, and the radial load is generally stationary relative to the axle bolt*.

[2. Radial bearing according to claim 1, wherein the outer part comprises a housing, the inner part comprises a shaft mounted in the housing, and the bearing seat of variable width is formed on the shaft, and the radial load rotates with the shaft.]

[3. Radial bearing according to claim 1, wherein the outer part comprises a housing, the inner part comprises shaft mounted in the housing, and the bearing seat of variable width is formed in the housing, and the radial load is generally stationary relative to the housing.]

[4. Radial bearing according to claim 1, wherein the outer part comprises a hub, the inner part comprises an axle bolt supporting the hub, and the bearing seat of variable width is formed in the hub, and the radial load rotates with the hub.]

[5. Radial bearing according to claim 1, wherein the outer part comprises a hub, the inner part comprises an axle bolt supporting the hub, and the bearing seat of variable width is formed on the axle bolt, and the radial load is generally stationary relative to the axle bolt.]

6. Radial bearing [according to claim 2, wherein the shaft comprises an unbalanced weight shaft, having] *comprising an unbalanced weight shaft mounted in a housing, the unbalanced weight shaft and the housing are rotatable relative to each other about a common longitudinal axis, the bearing comprises a bearing seat having a circumference, which is formed on the unbalanced weight shaft and which is generally stationary relative to a radial load rotating with the unbalanced weight shaft and acting on the bearing seat in a load zone, the bearing seat has a load carrying width that varies in a direction parallel to the longitudinal axis about the circumference of the bearing seat, such that, starting from the load zone, the bearing seat has a first load carrying width and outside of the load zone the bearing seat has a second width that is narrower than the first load carrying width, whereby a mass and weight of the bearing seat are reduced outside of the load zone, wherein the unbalanced weight shaft has* a center of mass arranged eccentric to the longitudinal axis due to one or more recesses on an outer periphery of the unbalanced weight shaft, and the recesses extend partially or completely on an other side of the longitudinal axis of the unbalanced weight shaft relative to the center of mass of the unbalanced weight shaft and are directly adjacent to the bearing seat of variable width*, wherein the radial bearing comprises a needle bearing without an inner ring on the bearing seat of variable width*.

[7. Radial bearing according to claim 6, wherein the unbalanced weight shaft is located in a device for balancing mass forces and/or mass moments of a reciprocating piston internal combustion engine with a crankshaft arranged parallel to the longitudinal axis of the unbalanced weight shaft and at least indirectly driving the unbalanced weight shaft for the reciprocating piston internal combustion engine.]

[8. Radial bearing according to claim 7, wherein the device includes two of the unbalanced weight shafts rotating in opposite directions at twice a crankshaft rotational speed.]

[9. Radial bearing according to claim 6, wherein the radial bearing comprises a needle bearing on the unbalanced weight shaft.]

10. Radial bearing according to claim [9] *6*, wherein a width of the needle bearing generally corresponds to a maximum width of the bearing seat of variable width [allocated to the needle bearing], and a minimum width of the bearing seat is smaller than a length of needles of the needle bearing, and for lubricating the needle bearing, only an unpressurized lubricant spray is provided.

11. Radial bearing according to claim [9] *6*, wherein the needle bearing is a needle sleeve [formed without an inner ring].

12. Radial bearing [according to claim 1,] *comprising an outer part opposite an inner part, the outer part and the inner part are rotatable relative to each other about a common longitudinal axis, the bearing comprises a bearing seat having a circumference, which is formed in the outer part or on the inner part and which is generally stationary relative to a radial load acting on the bearing seat in a load zone, the bearing seat has a load carrying width that varies in a direction parallel to the longitudinal axis about the circumference of the bearing seat, such that, starting from the load zone, the bearing seat has a first load carrying width and outside of the load zone the bearing seat has a second width that is narrower than the first load carrying width, whereby a mass and weight of the bearing seat are reduced outside of the load zone,* wherein the bearing comprises a roller bearing [and the width of] *on* the bearing seat *of variable width which* narrows to zero outside of the load zone.

13. Radial bearing according to claim 12, wherein the outer part comprises a housing, the inner part comprises a shaft mounted in the housing, and the bearing seat of variable width is formed on the shaft, and the radial load rotates with the shaft.

14. Radial bearing according to claim 13, wherein the shaft [comprises] *is* an unbalanced weight shaft, having a center of mass arranged eccentric to the longitudinal axis due to one or more recesses on an outer periphery of the unbalanced weight shaft, and the recesses extend partially or completely on an other side of the longitudinal axis of the unbalanced weight shaft relative to the center of mass of the unbalanced weight shaft and are directly adjacent to the bearing seat of variable width.

15. Radial bearing according to claim 14, wherein the unbalanced weight shaft is located in a device for balancing mass forces and/or mass moments of a reciprocating piston internal combustion engine with a crankshaft arranged parallel to the longitudinal axis of the unbalanced weight shaft and at least indirectly driving the unbalanced weight shaft for the reciprocating piston internal combustion engine.

16. Radial bearing according to claim 15, wherein the device includes two of the unbalanced weight shafts rotating in opposite directions at twice a crankshaft rotational speed.

17. Radial bearing according to claim 14, wherein the roller bearing is a needle bearing [on the unbalanced weight shaft].

18. Radial bearing according to claim 17, wherein a width of the needle bearing generally corresponds to a maximum width of the bearing seat of variable width [allocated to the needle bearing], and for lubricating the needle bearing, only an unpressurized lubricant spray is provided.

19. Radial bearing according to claim 17, wherein the needle bearing is a needle sleeve [formed] without an inner ring.

* * * * *